United States Patent [19]

Bowser

[11] 4,073,387
[45] Feb. 14, 1978

[54] METHOD AND APPARATUS FOR TIER FORMING ON A ROW BY ROW BASIS

[75] Inventor: Robert E. Bowser, Lynchburg, Va.

[73] Assignee: Simplimatic Engineering Co., Lynchburg, Va.

[21] Appl. No.: 642,576

[22] Filed: Dec. 19, 1975

[51] Int. Cl.² .............................................. B65G 57/26
[52] U.S. Cl. .................................... 214/6 P; 198/419; 214/152
[58] Field of Search ................... 214/6 P, 6 DK, 152; 198/425, 426, 427, 429, 430, 419

[56] References Cited

U.S. PATENT DOCUMENTS

| | | | |
|---|---|---|---|
| 2,581,742 | 1/1952 | Young | 198/429 |
| 2,946,465 | 7/1960 | Raynor | 214/6 P X |
| 2,997,187 | 8/1961 | Burt | 214/6 P |
| 3,294,257 | 12/1966 | Davies et al. | 214/6 P |
| 3,667,628 | 6/1972 | Gabler et al. | 214/6 P X |
| 3,732,991 | 5/1973 | Von Gal et al. | 214/6 P |

*Primary Examiner*—L. J. Paperner
*Attorney, Agent, or Firm*—James & Franklin

[57] ABSTRACT

In a palletizer, various load patterns are achieved through the arrangement of tiers or layers of rows of cartons, each constituent row therein having a given width. Conveying means are provided with a first side at which rows of cartons are received at spaced intervals and a second side. The conveying means, when actuated, is effective to transport the rows of cartons thereon towards the second side thereof. Means, responsive to the number of rows of cartons present on the conveying means, is effective, subsequent to the entry of each of the incoming rows of cartons at the first side of the conveying means, to actuate the conveying means to transport the rows presently thereon a distance substantially equal to the width of the incoming row, when less than R rows are present on the conveying means, and a selected distance sufficient to move the leading row of cartons on the conveying means to the second side thereof, when R rows are present thereon. This method of row formation prevents skewing of the cartons as is common with conventional tier forming methods and, in addition, gaps between cartons in adjacent rows can be preserved without the necessity for stop means. Actuatable stop means are provided at various positions along the conveying means. The rows of cartons can, where not being formed by the above method, be advanced to an actuated stop means or, alternatively, to an end stop at the second side of the conveyor means in order to provide additional versatility in tier formation.

27 Claims, 10 Drawing Figures

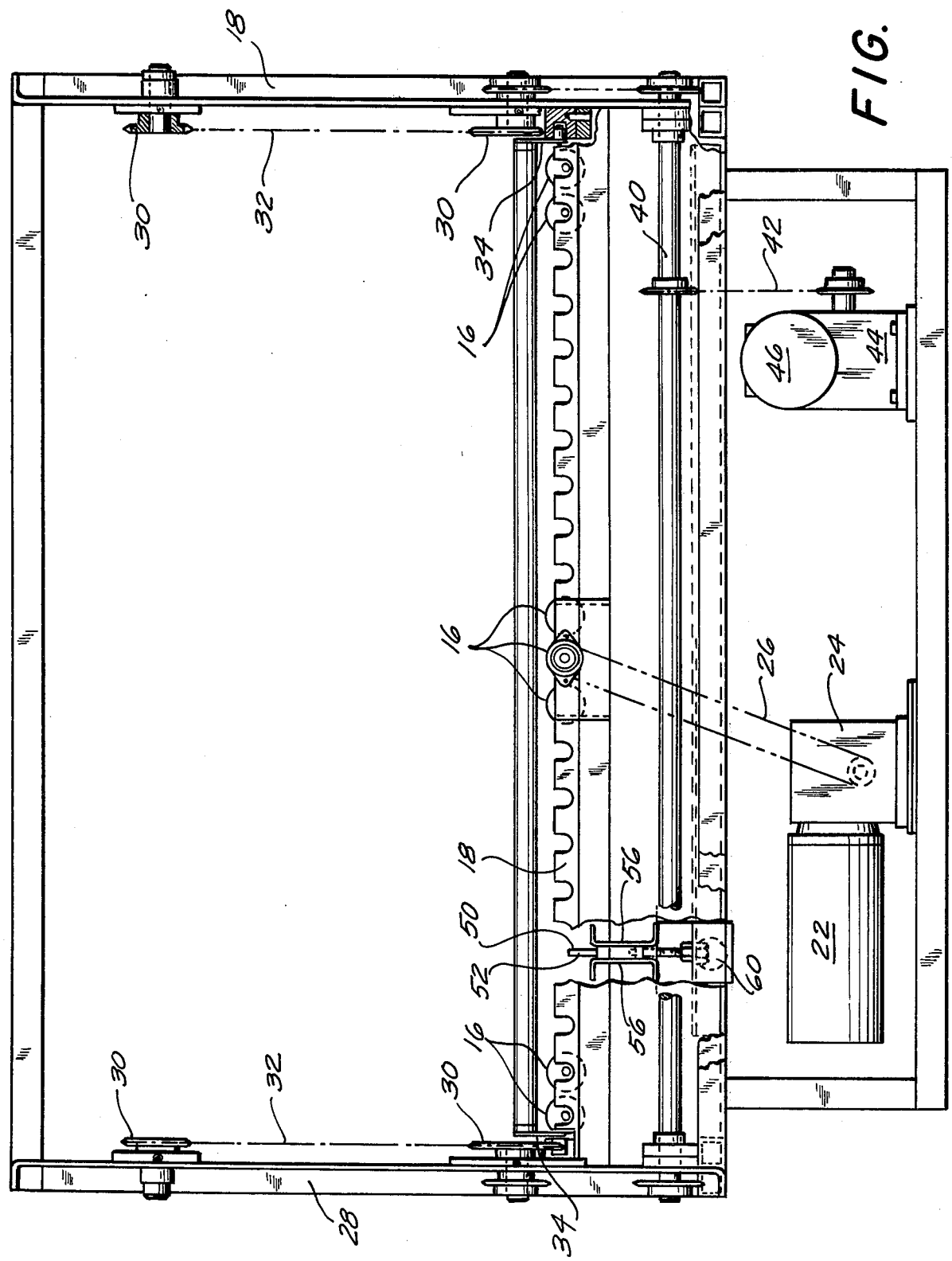

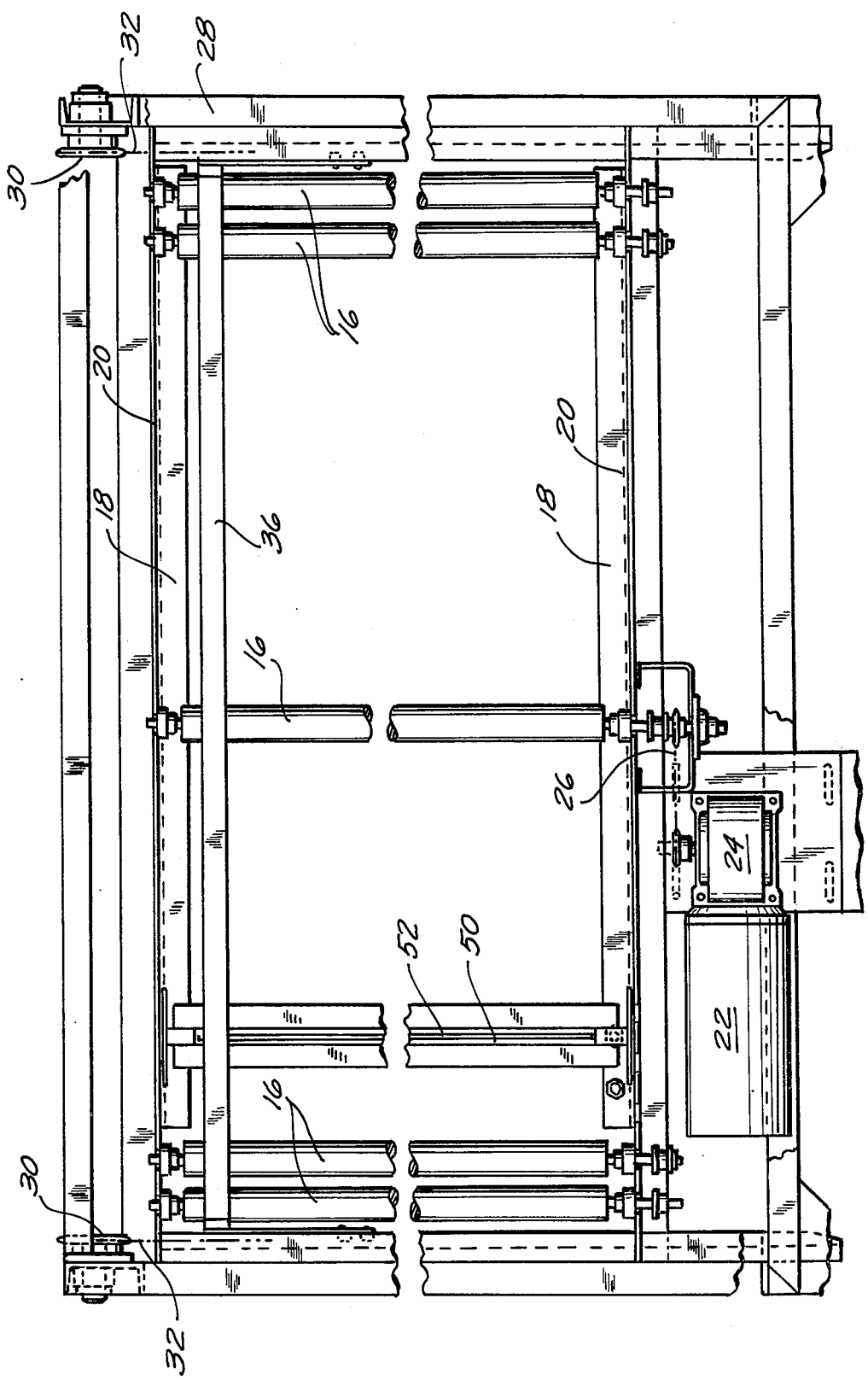

METHOD AND APPARATUS FOR TIER FORMING ON A ROW BY ROW BASIS

The present invention relates to palletizers and, in particular, to a method and apparatus for forming a tier of cartons on a row by row basis.

A palletizer is a mechanism which automatically arranges incoming cartons or other objects, hereinafter generally termed "cartons" for purposes of simplicity, into rows or tiers which are then formed into tiers or layers. The formed tiers are subsequently deposited successively onto a pallet which, when fully loaded, is moved from the mechanism by a fork-lift truck or the like for storage or shipping.

Palletizers are manufactured in a variety of different forms, but, in general, may comprise a carton orienting means, a row forming means, a layer or tier forming means, an elevator or hoist located below the draw plate upon which the formed layers or tiers are successively deposited, and a means for conveying empty pallets to the elevator or hoist and for removing loaded pallets from the elevator or hoist.

Preferably, the carton orienting means includes a carton inverter and a means for turning the carton through a 90° angle. Adjustable pattern guides and stop plates may also be provided. In fully automatic palletizers, the functions of the various portions of the mechanism are synchronized and controlled by a main control unit which may be programmable through the use of tape or other program media. By controlling the case inverter, the means for turning the case 90°, the row forming means with its stops and guides, and the tier forming means, a large variety of different load patterns can be achieved to provide the load stability and degree of compactness required by the particular size or shape and weight of the cartons involved.

In order to achieve a large variety of different load patterns automatically, it is necessary that the palletizer, and particularly, the row forming means and the layer or tier forming means be quite versatile in operation. Versatility in forming different patterns is achieved by developing the capability to individually orient each carton in the pattern and also by the maintaining of gaps or spaces between adjacent cartons in a row as well as between cartons in adjacent rows.

It is relatively easy to establish a gap or space between adjacent cartons in a row. Many conventional row forming means comprise a roller table comprising a plurality of parallel oriented, spaced, coplanar rollers. The rollers are driven by a motor or the like which is actuated by the control unit in accordance with the program. Incoming cartons, after they are appropriately oriented, enter one side of the row forming table and are conveyed by the rollers towards an end stop at the other side of the table. If a gap or opening is required, a stop is provided at the appropriate location along the table in the form of a plate which is movable between two adjacent rollers from below the surface of the rollers to a position above the surface of the rollers. This stop prevents a carton from progressing any further along the table and, thus, serves to maintain a space or gap between the cartons, in the desired location, as the remainder of the cartons enter the row forming table. Thus, through the use of several strategically located stops, a row of cartons may be formed with spaces or gaps between adjacent cartons.

The stops utilized to form the spaces or gaps between adjacent cartons in a row may be actuated in any appropriate manner, such as by pneumatic or hydraulic cylinders. The control unit functions to synchronize the actuation of the stops. In this manner, the program is utilized to control the formation of the gaps or openings between adjacent cartons in the row. Thus, the formation of the openings or gaps between the adjacent cartons is variable to produce a variety of different row patterns.

After the row is formed on the row forming table, it is swept from the row forming table to a tier forming table. The tier forming table may comprise a plurality of driven rollers similar to those of the row forming table. Normally, these rollers are oriented perpendicular to the rollers of the row forming table to permit the formed row to be swept from the row forming table in a direction perpendicular to the movement of the cartons on the row forming table, thereby maintaining the spaces or gaps therein.

In conventional tier forming tables, as each row is received from the row forming table, the rollers are driven to advance that row to the opposite end of the table. Thus, the first row received on the tier forming table is advanced until it is adjacent an end stop on the opposite end of the tier forming table. When the next row is received, the rollers are again driven such that this row is advanced against the first row. In this manner, each successive row is advanced by the movement of the rollers until it is adjacent the previous row.

This system of tier formation suffers from two distinct drawbacks. After the first row has been conveyed against the end stop and the tier table, the rollers stop rotating until the next row has entered. Therefore, the rollers are again energized to move the next row adjacent the first row. Since all of the rollers on the table are energized simultaneously, the rollers underneath the cartons which are already adjacent the end stop are rotating as the incoming rows are being transported. This often causes these cartons to skew out of position. The skewing of these cartons disrupts the load pattern and requires the assistance of an operator in order to properly realign the cartons. Obviously, this disrupts the smooth functioning of the apparatus and, in addition, requires that an operator be continuously available to oversee the operation of the tier forming means.

In addition, the conventional system of tier formation does not permit the maintenance of gaps or openings between cartons in adjacent rows without the use of strategically located stops similar to those on the row table. This is because each row is moved along the table to a position immediately adjacent the preceding row by the rotation of the rollers. Thus, the gaps or openings between the cartons in the adjacent rows will be lost unless an elaborate system of actuatable stops is utilized. This system, however, would be extremely difficult to implement because a gap may be desired between only one set of aligned cartons in adjacent rows and not between the other sets of aligned cartons in those rows. Therefore, the stop cannot extend over the entire width of the tier forming table as did the corresponding stop on the row forming table. Further, since palletizers of the type in question are usable with a variety of different size cartons and with different numbers of cartons per row, it is difficult to determine what the optimum length of the stops should be. These complications have often caused manufacturers of conventional palletizers to forego the use of actuatable stops in the tier forming table, thereby preventing the maintenance of gaps or openings between cartons in adjacent rows. As a result, the variety of load patterns which can be achieved by the palletizer is substantially reduced and the versatility of the apparatus in general is deceased.

It is, therefore, a prime object of the present invention to provide a method and apparatus for tier forming on a row by row basis whereby tiers can be formed with gaps or openings between cartons in adjacent rows.

It is another object of the present invention to provide a method and apparatus for tier forming on a row by row basis wherein a complicated system of actuatable stops is not required for the maintenance of a gap or opening between cartons in adjacent rows.

It is a further object of the present invention to provide a method and apparatus for tier forming on a row by row basis which is capable of advancing the rows on the table a distance along the table equal to the width of the incoming row.

It is still another object of the present invention to provide a method and apparatus for tier forming on a row by row basis which is capable of forming the tier in a manner such that the entire tier is not advanced to the end stop until after the tier is formed.

It is a still further object of the present invention to provide a method and apparatus for tier forming on a row by row basis wherein an incoming row can be advanced the width of that row, or to an actuated stop means or to the end stop, depending upon the requirements of the control unit program.

In accordance with the present invention, method and apparatus for tier forming on a row by row basis is provided. The tiers are formed of R rows of cartons, each row having a given width. Conveying means is provided having a first side at which the rows of cartons are received, at spaced intervals, and a second side. The conveying means, when actuated, transports the rows of cartons thereon towards the second side. Means, responsive to the number of rows present on the conveying means, is effective, subsequent to the entry of each of the incoming rows of cartons at the first side, to actuate the conveying means to transport the rows present thereon a distance substantially equal to the width of the incoming row, when less than R rows are present on the conveying means, and a selected distance sufficient to move the leading row on said conveying means to said second side thereof, when R rows are present thereon.

An end stop guide is situated on the second side of the conveying means. The selected distance is substantially equal to the distance between the leading row and the end stop guide. The conveying means comprises a plurality of parallelly situated coplanar rollers and means for driving the rollers which is actuated by an actuating means, the actuating means being capable of driving the rollers for a given time determined by the program controlling the actuating means. In order to enhance the versatility of the palletizer, tiers may be formed on a row by row basis, as indicated above, or in other ways. For instance, a plurality of individually actuatable stop means may be provided along the conveying means. The stop means are effective, when actuated, to prevent the movement along the conveying means of the cartons in one or more rows. Thus, the actuating means may be energized for a given time after the incoming row has traversed the width of that row so that row is moved to abut the actuatable stop means. Alternatively, the actuating means is capable of driving the rollers until the rows collect at the end stop guide, as in conventional row forming tables.

The actuating means is a part of the control unit and is energized in accordance with the program. Further, means for synchronizing the actuation of the stop means with the actuation of the conveying means is provided within the conrol unit such that the control unit supervises the orientation of the cartons; the formulation of the row, including the gaps or openings between adjacent cartons in the row; and the formation of the tier, including the formation of gaps or openings between cartons in adjacent rows. In this manner, a wide variety of different load patterns can be formed completely automatically and load patterns can be changed by merely changing the program.

To these and such other objects as may hereinafter appear, the present invention relates to a method and apparatus for tier forming on a row by row basis as set forth in the accompanying claims and described in the present specification, taken together with the accompanying drawings wherein like numerals refer to like parts and in which:

FIG. 3 is a side view of the tier forming means of the present invention showing an end view of the gate stop in cutaway;

FIG. 4 is a plan view of the tier forming means of the present invention; and

FIGS. 5a–c and 6a–c are two sets of sequential schematic views of the formation of a tier of the tier forming means of the present invention.

Figure 1:
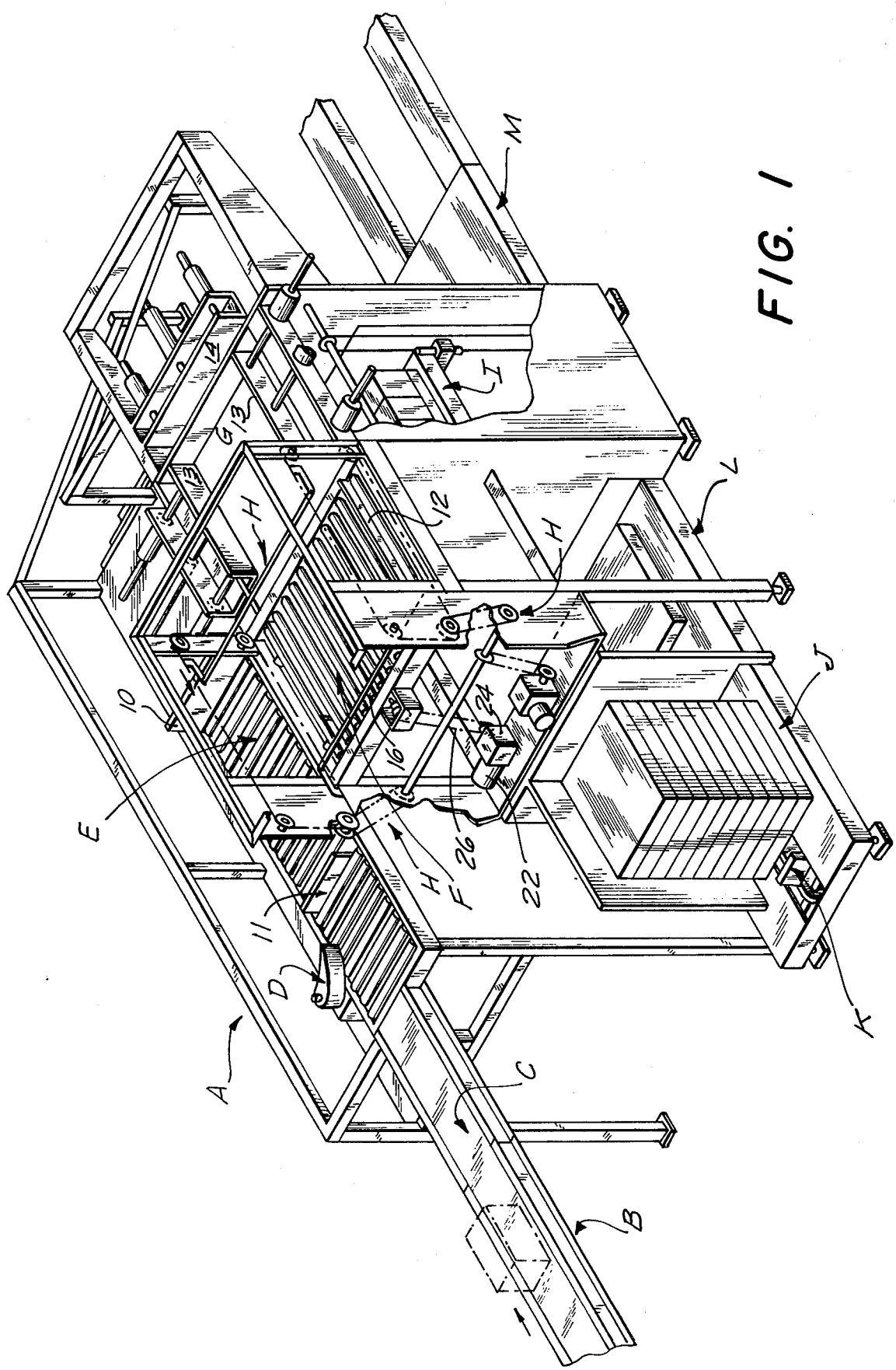
FIG. 1 is an isometric view of a palletizer of the type which may utilize the method and apparatus for tier forming on a row by row basis of the present invention.

The tier forming means of the present invention can be used in conjunction with a variety of automatic palletizers having different components which may be arranged in a variety of different orientations. However, for purposes of illustration only, FIG. 1 depicts an automatic palletizer representative of the type of palletizers with which the present invention may be utilized. The palletizer comprises a support structure, generally designated A, including vertical and horizontal supporting elements, as well as an operator's platform and stairways providing access thereto. Structure A may be arranged in a variety of different manners, depending upon the particular requirements of the palletizer.

Incoming cartons enter the palletizer by an infeed conveyor, generally designated B. Apparatus for flap closing and setting (not shown) and for carton inverting (not shown) may be utilized prior to infeed conveyor B, if desired. The flap closer and setter acts on the flaps on the carton to the degree that they will become stackable without further manipulation. The basic operation of such a flap closer and setter may take place in two steps. First, the carton flaps are closed by means of air actuated arm and preset flap guides. Thereafter, the flap setter crimps the carton flap by means of a series of rollers. After the flaps are closed and set, the carton may be transferred to a carton inverter which may invert the carton or not, in accordance with the loading requirements.

As the cartons enter the palletizer by means of infeed conveyor B, they are metered by a brake-meter belt, generally designated C, one at a time, passing a photoelectric cell (not shown). The photoelectric cell counts the carton into the proper program pattern sequence. The brake-meter belt C delivers the carton to a carton turning apparatus, generally designated D, which serves to turn or rotate the carton 90°, if such a directional reorientation is called for by the program. Turning means D comprises an arm or flipper pivotally mounted on the side of the carton path which, when appropriately positioned, engages one corner of the carton causing the carton to rotate about that corner such that the carton is reoriented 90° with respect to its original position.

The carton is then conveyed to a row forming table, generally designated E, wherein the approprriate number of cartons are accumulated to form a row. The row forming means may comprise a conveyor-style roller table having a plurality of powered rollers. A full solid row of cartons are formed against each other and held by a fixed, but position adjustble backstop 10. Should the row formation require spaces or gaps between adjacent cartons, one or more row stops (not shown) may be raised by a pneumatic cylinder (not shown) between the driven rollers of the row table at the appropriate positions. The row stops are adjusted to proper spacing for the various carton sizes and pattern variations. When the row is completed, a row gate 11 is raised in a manner similar to that of the row stops. Row gate 11 separates the incoming cartons from the completed row until the row sweep is completed. After the row sweep is completed, the row gate retracts and the next row continues to form.

The row sweep (not shown) pushes the formed row onto a tier forming table, generally designated F, which is a conveyor-style roller table similar to the row forming table. After the row sweep has placed the row on the tier table, the rollers thereon can be driven to advance the row one row width, thereby permitting clearance space for receiving the next row in sequence. When the total number of rows required to form a tier or layer have been placed on the tier table F, the rollers can be driven to advance the carton against a tier table end stop (not shown in FIG. 1). The tier table is preferably provided with a position adjustable end stop and pneumatically raisable stops (not shown) similar to those in the row forming table. These stops may be used as end stops, as explained below, which position the tier at the proper position for a tier sweep.

After the entire tier is formed in position on tier table F, the full tier is swept onto the draw plate, generally designated G. The tier pattern is guided onto the draw plate G by means of side guides 13, adjustable to the dimensional width of the pattern and are swept against an end stop guide 14, position adjustable to the length of the pattern. When the pattern is in place on draw plate G, the end stop guide 14 holds the tier pattern in position for retraction of the draw plate.

Immediately beneath draw plate G is a vertically movable hoist or elevator, generally designated I, upon which a pallet is situated. A stack of pallets is placed in the pallet infeed area, generally designated J. One pallet at a time is moved from the bottom of the stack and transferred by means of a pallet moving mechanism K to a pallet ready stage, generally designated L, wherein it is loaded on hoist I immediately after the removal of the loaded pallet therefrom. Loaded pallet is transferred to a pallet outfeed area, generally designated M, where it may be conveniently removed by a fork-lift truck or the like or, alternatively, automatically transferred to a storage area.

As can best be seen in FIGS. 3 and 4, the tier forming means of the present invention comprises a plurality of individual rollers 16 which are rotatably mounted between two parallel supports 18 so as to form a surface along which the cartons are conveyed. Rollers 16 are interconnected by means of a pair of chains or belts 20 which are situated along each of the supports 18. One of the central rollers 16 is connected to a motor 22 and its associated reduction gearing 24 by means of a belt or chain 26 such that the energization of motor 22 serves to drive all of the rollers 16 simultaneously.

Figure 2:
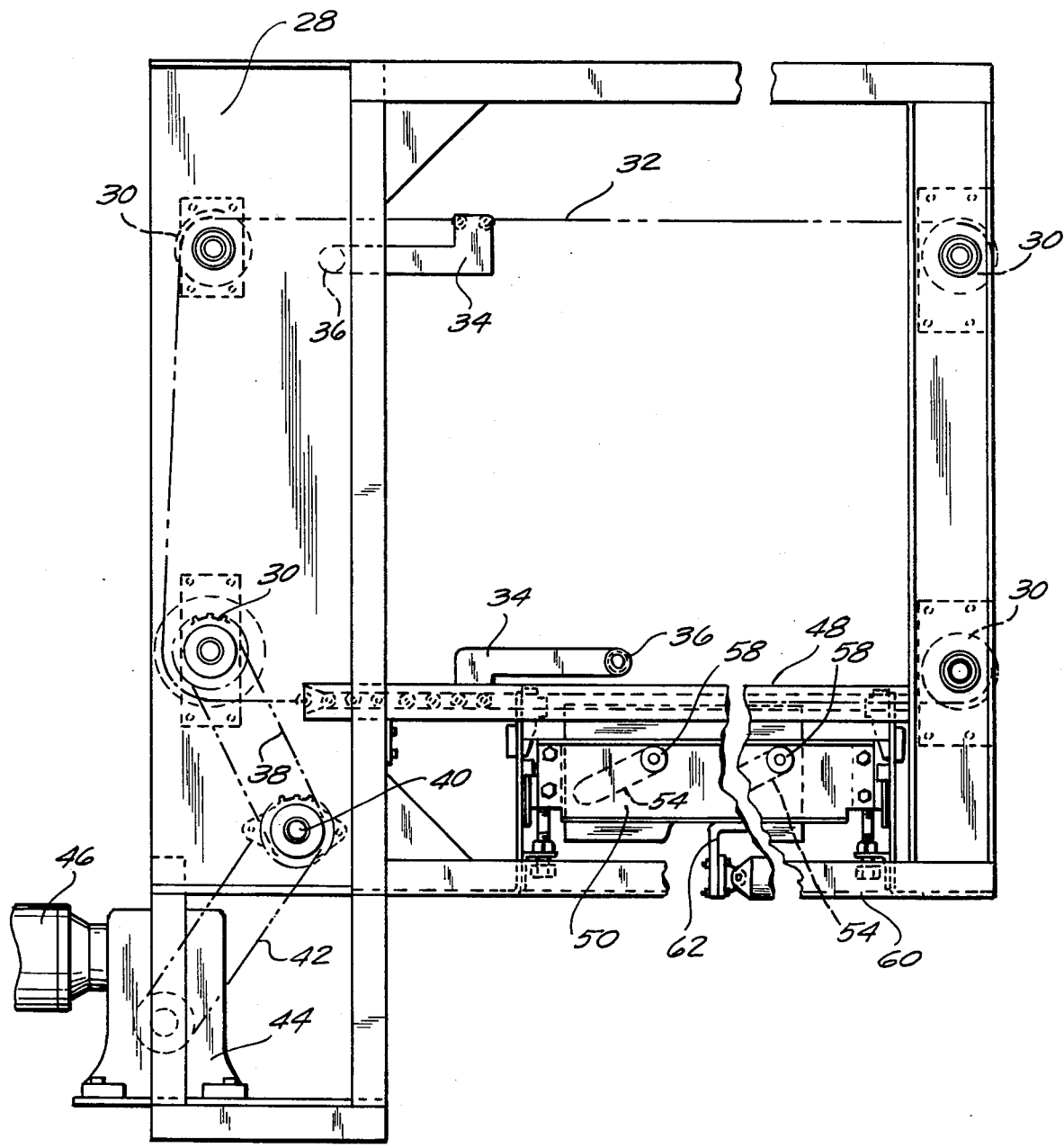
FIG. 2 is a front view of a stop means and an end view of the means for sweeping a tier onto the draw plate.

The tier sweep, as seen in FIGS. 2, 3 and 4, comprises a pair of upstanding supports 28, each of which has four pulleys 30 thereon. Situated around each set of four pulleys 30 on each upstanding support 28, in an endless belt or chain 32. Each chain or belt 32 is provided with a pair of sweep attachments 34, each of which is situated half way around belt or chain 32 from the other. Each of the attachments 34 carries a sweep bar 36 which is connected, at the other end thereof, to the corresponding attachment 34 on the other side of the table.

As shown in FIG. 2, one of the pulleys 30 is connected by means of a belt of chain 38 to a pulley 40 which, in turn, is connected by a belt or chain 42 to a reducer 44 attached to a motor 46. After the formation of the tier is completed, motor 46 is energized to drive pulley 40 by means of belt or chain 42 and reducer 44. Pulley 40, by means of belt or chain 38, drives pulley 30 which, in turn, moves belt or chain 32 such that attachments 34 follow a substantially rectangular path. The bottom of that path will intersect the carton situated on the tier forming table such that as bar 36 is moved through the lower horizontal portion of the path along sweep track guide 48, it pushes the tier of cartons situated on the tier forming table onto the draw plate.

After the bar has completed its horizontal sweep, it moves vertically towards the upper horizontal portion of the path while the other bar 36 moves towards the initial position for sweeping the next formed tier. In this manner, as one sweep bar 36 completes the sweep, the other sweep bar 36 is moved into position to sweep the next tier onto the draw plate after it is formed.

An actuatable stop 50 is illustrated as situated near the input side of the tier forming means. Stop 50 comprises a plate 52 which is vertically movable with respect to rollers 16 at a point between two adjacent rollers such that it is effective, when actuated, to extend above the surface of rollers 16 thereby preventing the movement of cartons along the tier forming table.

Plate 52 has a pair of elongated slots 54 which are biased at an angle with respect to the path of vertical movement of the plate 52, as shown in FIG. 2. On each side of plate 52 is a bracket 56 between which are situated a pair of pins 58 which pass through slots 54, respectively. A pneumatic cylinder 60 is horizontally situated and connected to plate 52 by means of a bracket 62 such that when cylinder 69 is actuated, bracket 62 is moved horizontally to the right (as shown in FIG. 2) causing plate 52 to move vertically and to the right as slots 54 move in a path defined by pins 58, such that plate 52 extends vertically above the surface of rollers 16.

It should be understood that only a single stop assembly has been illustrated herein for purposes of simplicity. However, a plurality of such stop assemblies may be provided at different points along the tier table, if desired. The cylinders which move the stop assemblies are each individually connected to the control unit and, thus, may be actuated individually, as required by the program.

Figure 5A:
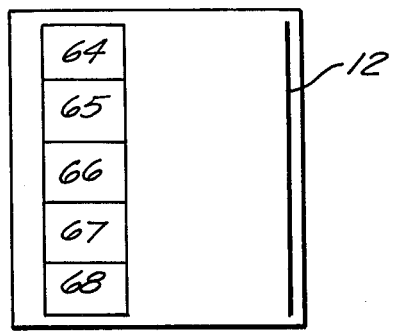
Figure 5C:
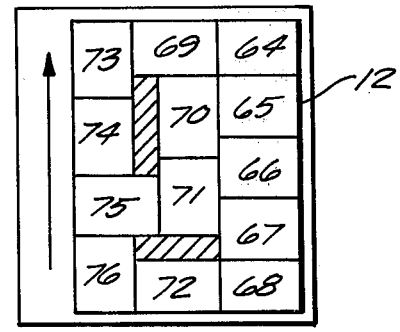
Figure 5B:
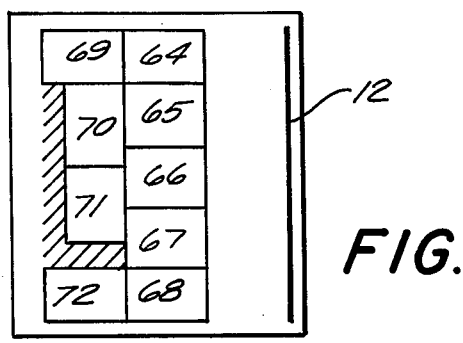

FIGS. 5a through 5c illustrate the formation of an illustrative load pattern with a gap between cartons in adjacent rows without the necessity for using any stops with the exception of an end stop. It will be readily apparent that it would be impossible to form such a pattern on a conventional tier forming table which moves each incoming row against the previous row without the use of a complicated system of stops which do not extend along the entire width of the tier forming table.

In FIG. 5a, the first row of cartons containing cartons 64, 65, 66, 67 and 68, all of which are oriented lengthwise in the direction of movement, without any gaps therebetween, are received on the incoming side of the table. Position adjustable end stop 12 is present on the opposite side of the table.

As shown in FIG. 5b, as the second row of cartons, containing cartons 69, 70, 71 and 72 enters the table, the first row of cartons, 64, 65, 66, 67 and 68 is conveyed along the table a distance equal to the width of the second row of cartons, which is defined as being the distance equal to the maximum dimension of any of the cartons in the incoming row in the direction of movement of the cartons along the table.

In this case, the second row comprises cartons 69 and 72 which are parallel to the cartons in the first row and two cartons 70 and 71, which are oriented 90° with respect thereto. Between cartons 71 and 72 a space or gap has been formed on the row forming table.

The load pattern illustrated has three rows. Therefore, the placement of the third and last row on the input side of the tier table causes the rollers to convey the formed tier across the table to an end stop 12. The third row of cartons comprises three cartons 73, 74, 75 and 76. Cartons 73, 74 and 76 are parallel to cartons 70 and 71 in the second row and carton 75 is parallel to the cartons in the first row. After the tier has been formed and moved against the appropriate stop, as shown in FIG. 5c, end stop 12 is retracted and the sweep mechanism is actuated to move the formed tier onto the draw plate, in the direction shown by the arrow. It should be noted that a gap or space is present between cartons 70 and 74. This gap is maintained by the present system without the actuation of any stops in the center of the table. Such would not be possible of each row was moved along the table individually, as in conventional tier forming tables.

Figure 6A:
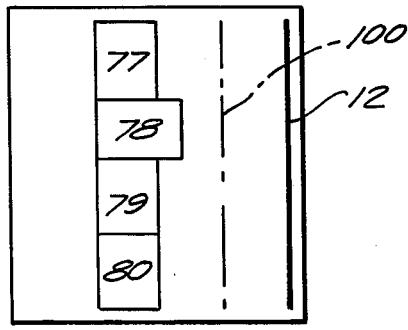
Figure 6C:
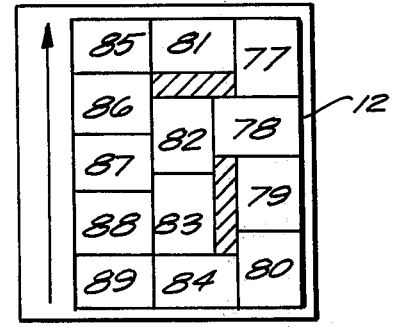
Figure 6B:
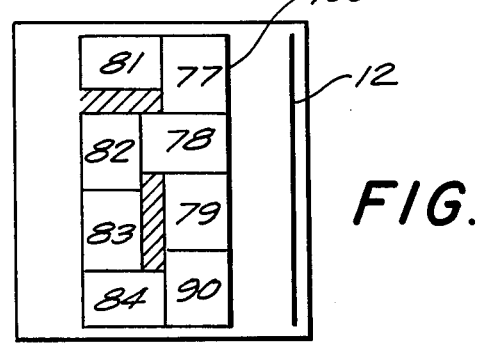

FIGS. 6a-6c show the formation of a tier through the actuation of an intermediary stop. As shown in FIG. 6a, the first row of cartons, comprising cartons 77, 78, 79, 80 enters the table. Cartons 77, 79 and 80 are situated lengthwise perpendicular to the path of movement along the tier table whereas carton 78 is situated lengthwise in the direction of the tier table. As shown in FIG. 6b, the second row of cartons has entered the tier table and the both rows of cartons have been advanced against a stop 100 which has been actuated for this purpose. The movement of the first row of cartons against stop 100 has caused carton 78 to move relative to cartons 77 and 79. The second row of cartons comprise cartons 81, 82, 83, 84, cartons 82 and 83 being situated lengthwise perpendicular to the path of movement whereas cartons 81 and 84 are situated lengthwise perpendicular to the path of carton movement. A gap formed on the row table is present between cartons 81 and 82. Further, the gap between cartons 83 and 79 is maintained as the tier is formed on a row by row basis.

When the third row of cartons enters the tier forming table, stop 100 is deactuated and the entire formed tier is moved against end stop 12. The third row of cartons contains cartons 85, 86, 87, 88 and 89, all of which are situated lengthwise parallel to the direction of movement along the tier table. After the movement of the formed tier against the end stop 12, end stop 12 is retracted and the sweep mechanism is utilized to move the entire formed tier in the direction of the arrow onto the draw plate.

It should be noted that the particular patterns illustrated in FIGS. 5a-5c and 6a-6b are depicted herein for purposes of illustration only and represent two of a vast number of different load patterns which are possible with the tier forming system of the present invention.

It should, therefore, be understood that the present invention is a method and apparatus for tier forming on a row by row basis which permits the formation of tiers with gaps between cartons in the adjacent rows without the necessity of a complex system of stops. Further, there is no tendency for any of the cartons to skew out of position and, thus, the palletizer can function automatically without the constant attention of an operator. Moreover, the present system provides great versatility because the rows can be advanced either the width of a row or to an actuated stop or to the end stop, in accordance with the requirements of the load pattern being formed. Thus, the system of the present invention has superior versatility and yet is considerably simpler than conventional systems that are designed to perform the tier forming function.

While only a single embodiment of the present invention has been disclosed herein for purposes of illustration, it should be understood that many variations and modifications can be made herein. It is intended to cover all of these variations and modifications which fall within the scope of the following claims.

I claim:

1. Means for forming a tier of R rows of cartons, each row having a given width, for use with a palletizer or the like comprising conveying means having a first side at which rows of cartons are received at spaced intervals and a second side, said conveying means, when actuated, transporting the rows of cartons thereon towards said second side, and means responsive to the number of rows present on said conveying means and effective, subsequent to the entry of each of the incoming rows of cartons at said first side, to actuate said conveying means to transport the rows present thereon a distance substantially equal to the width of the incoming row, when less than R rows are present on the conveying means, and a selected distance sufficient to move the leading row on said conveying means to said second side thereof, when R rows are present thereon.

2. The tier forming means of claim 1 further comprising an end stop guide situated on said second side of said conveying means and wherein said selected distance is substantially equal to the distance between said leading row andd said guide.

3. The tier forming means of claim 2 wherein said conveying means comprises a plurality of parallelly situated coplanar rollers and means for driving same actuated by said actuating means, said actuating means being capable of driving said rollers for a given time after said rows have traversed a distance equal to the width of said incoming row.

4. The tier forming means of claim 1 further comprising a plurality of individually actuatable stop means, said stop means being effective, when actuated, to prevent the movement along said conveying means of cartons in one or more rows.

5. The tier forming means of claim 4 wherein said stop means are actuated by said actuating means.

6. The tier forming means of claim 5 further comprising means for synchronizing the actuation of said stop means with the actuation of said conveying means.

7. The tier forming means of claim 3 further comprising a plurality of individually actuatable stop means, said stop means being effective, when actuated, to prevent the movement along said conveying means of cartons in one or more rows.

8. The tier forming means of claim 7 wherein said stop means are actuated by said actuating means.

9. The tier forming means of claim 8 further comprising means for synchronizing the actuation of said stop means with the actuation of said conveying means.

10. Apparatus for loading a plurality of tiers of R rows of cartons on a pallet or the like comprising carton infeed means, row forming means, tier forming means, means for transferring a formed row of cartons from said row forming means to said tier forming means, a hoist movable relative to said tier forming means having a pallet situated thereon and means for depositing a formed tier of cartons on said hoist, said tier forming means comprising conveying means having a first side at which rows of cartons are received at spaced intervals and a second side, said conveying means, when actuated, transporting the rows of cartons thereon towards said second side, and means responsive to the number of rows present on said conveying means and effective, subsequent to the entry of each of the incoming rows of cartons at said first side, to actuate said conveying means to transport the rows present thereon a distance substantially equal to the width of the incoming row, when less than R rows are present on said conveying means, and a selected distance sufficient to move the leading row on said conveying means to said second side thereof, when R rows are present thereon, thereby to form a tier of cartons.

11. The tier forming means of claim 10 further comprising an end stop guide situated on said second side of said conveying means and wherein said selected distance is substantially equal to the distance between said leading row and said guide.

12. The tier forming means of claim 11 wherein said conveying means comprises a plurality of parallelly situated coplanar rollers and means for driving same actuated by said actuating means, said actuating means being capable of driving said rollers for a given time after said rows have traversed a distance equal to the width of said incoming row.

13. The tier forming means of claim 10 further comprising a plurality of individually actuatable stop means, said stop means being effective, when actuated, to prevent the movement along said conveying means of selected cartons in one or more rows.

14. The tier forming means of claim 13 wherein said stop means are actuated by said actuated by said actuating means.

15. The tier forming means of claim 14 further comprising means for synchronizing the actuation of said stop means with the actuation of said conveying means.

16. The tier forming means of claim 15 further comprising a plurality of individually actuatable stop means, said stop means being effective, when actuated, to prevent the movement along said conveying means of selected cartons in one or more rows.

17. The tier forming means of claim 12 further comprising a plurality of individually actuatable stop means, said stop means being effective, when actuated, to prevent the movement along said conveying means of selected cartons in one or more rows.

18. The tier forming means of claim 17 wherein said stop means are actuated by said actuating means.

19. The tier forming means of claim 18 further comprising means for synchronizing the actuation of said stop means with the actuation of said conveying means.

20. A method of forming a tier of R rows of cartons, each row having a given width, on a tier forming means of the type having a conveying means with first and second sides, said method comprising the steps of: receiving, at the first side, a plurality of incoming rows of cartons at spaced intervals; conveying the rows present on the conveying means towards the second side a distance substantially equal to the width of the incoming row, subsequent to the receipt of each incoming row less than R; and conveying the rows present on the conveying means a distance sufficient to move the leading row on the conveying means to the second side thereof, subsequent to the receipt of the Rth incoming row.

21. The method of claim 20 wherein the conveying means has an end stop guide situated at the second side thereof and wherein the step of actuating the conveying means to move the leading row to the second side comprises the step of actuating the conveying means to move the leading row to said end stop guide.

22. The method of claim 21 wherein the conveying means has a plurality of individually actuatable stop means and further comprising the step of selectively actuating the stop means to prevent the movement by the conveying means of selected cartons in one or more rows thereon.

23. The method of claim 22 further comprising the step of synchronizing the actuation of the stop means and the conveying means.

24. A method of forming a pattern of cartons consisting of T tiers of R rows each, the method comprising the steps of: forming a row of cartons; transferring the formed row to a tier forming means having a conveying means with an entrance side and a second side; receiving, at the entrance side, a plurality of incoming rows of cartons at spaced intervals; conveying the rows present on the conveying means towards the second side thereof a distance substantially equal to the width of the incoming carton, subsequent to the receipt of each incoming row less than R; conveying the rows present on the conveying means a distance sufficient to move the leading row on the conveying means to the second side thereof, subsequent to the receipt of the Rth incoming row, depositing the rows on the conveying means on a hoist, repositioning the hoist to receive the next tier and repeating the above steps until T tiers have been deposited on the hoist.

25. The method of claim 24 wherein the conveying means has an end stop guide situated at the second side thereof and wherein the step of actuating the conveying means to move the leading row to the second side comprises the step of actuating the conveying means to move the leading row to the back stop guide.

26. The method of claim 25 wherein the conveying means has a plurality of individually actuatable stop means and further comprising the step of selectively actuating the stop means to prevent the movement by the conveying means of selected cartons in one or more rows thereon.

27. The method of claim 26 further comprising the step of synchronizing the actuation of the stop means and the conveying means.

* * * * *